(12) United States Patent
Zimmerer

(10) Patent No.: US 10,013,466 B2
(45) Date of Patent: Jul. 3, 2018

(54) USING TIME INFORMATION TO PRUNE QUERIES AGAINST PARTITIONED DATA

(71) Applicant: Peter K. Zimmerer, Walldorf (DE)

(72) Inventor: Peter K. Zimmerer, Walldorf (DE)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 14/572,010

(22) Filed: Dec. 16, 2014

(65) Prior Publication Data

US 2016/0171035 A1    Jun. 16, 2016

(51) Int. Cl.
*G06F 17/30* (2006.01)

(52) U.S. Cl.
CPC .............................. *G06F 17/30551* (2013.01)

(58) Field of Classification Search
CPC ................................................ G06F 17/30551
See application file for complete search history.

(56) References Cited

U.S. PATENT DOCUMENTS

| | | | |
|---|---|---|---|
| 6,574,742 B1 * | 6/2003 | Jamroga | G06F 17/3028 705/2 |
| 7,415,473 B2 | 8/2008 | Zimmerer | |
| 7,593,957 B2 | 9/2009 | Biedenstein et al. | |
| 7,765,221 B2 | 7/2010 | Zimmerer et al. | |
| 7,865,459 B2 | 1/2011 | Zimmerer et al. | |
| 7,996,633 B2 | 8/2011 | Zimmerer et al. | |
| 8,626,702 B2 | 1/2014 | Schlueter et al. | |
| 2007/0255846 A1 * | 11/2007 | Wee | H04L 29/06027 709/231 |
| 2008/0059524 A1 * | 3/2008 | Biedenstein | G06F 17/30292 |
| 2010/0082705 A1 * | 4/2010 | Ramesh | G06F 17/30471 707/808 |
| 2010/0332454 A1 * | 12/2010 | Prahlad | G06F 17/30082 707/654 |
| 2011/0208696 A1 * | 8/2011 | Pang | H04L 63/0428 707/610 |
| 2017/0235848 A1 * | 8/2017 | Van Dusen | G06F 17/30979 705/12 |

* cited by examiner

*Primary Examiner* — Huawen A Peng
(74) *Attorney, Agent, or Firm* — Fish & Richardson P.C.

(57) ABSTRACT

The disclosure generally describes computer-implemented methods, software, and systems, including a method for storing information. In a database including plural records having time-related characteristics, a time-related partition is identified for relocating records in the partition to secondary storage. For each pair in one or more pairs of different time-related characteristic values of the records in the partition, a time-related distance is determined between the different time-related characteristic values. The time-related distances are aggregated for the partition. Information is stored in an index in primary storage that identifies the aggregated time-related distances for the partition.

20 Claims, 5 Drawing Sheets

USING TIME INFORMATION TO PRUNE QUERIES AGAINST PARTITIONED DATA

BACKGROUND

The present disclosure relates to information storage and retrieval.

Data that is seldom used can be archived. For example, the data may be old information that is likely not to be accessed frequently in the future. Archiving can occur, for example, along partitions, such as separating data based on date/time-associated characteristics. Archiving data can reduce information storage costs, e.g., reducing the amount of data that needs to be stored in primary storage. Accessing information, such as in response to a query, can include accessing data that has been archived and is stored in secondary storage.

SUMMARY

The disclosure generally describes computer-implemented methods, software, and systems for storing information. For example, in a database including plural records having time-related characteristics, a time-related partition is identified for relocating records in the partition to secondary storage. For each pair in one or more pairs of different time-related characteristic values of the records in the partition, a time-related distance is determined between the different time-related characteristic values. The time-related distances are aggregated for the partition. Information is stored in an index in primary storage that identifies the aggregated time-related distances for the partition.

One computer-implemented method includes: identifying, in a database including plural records having time-related characteristics, a time-related partition for relocating records in the partition to secondary storage; for each pair in one or more pairs of different time-related characteristic values of the records in the partition, determining a time-related distance between the different time-related characteristic values; aggregating the time-related distances for the partition; and storing, in an index, information in primary storage that identifies the aggregated time-related distances for the partition.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further includes: receiving a query for information associated with the database, the query including time-related selection criteria; determining, using the index and the time-related selection criteria, if secondary storage needs to be accessed to satisfy the query; in response to the query, accessing records in the primary storage; based on a determination that secondary storage needs to be accessed, accessing records in the secondary storage; and providing query results using the accessed records from the primary storage and the secondary storage.

In a second aspect, combinable with any of the previous aspects, the time-related range of values include a lower limit that is a minimum of time-related distances between pairs of time-related characteristic values and an upper limit that is a maximum of time-related distances between pairs of time-related characteristic values.

In a third aspect, combinable with any of the previous aspects, the method further comprises detecting that an update (including also insertion or deletion) has occurred to a record in the secondary storage and updating the index in association with the update.

In a fourth aspect, combinable with any of the previous aspects, the method further comprises creating a pruned query, including transforming a predicate in the query based on information in the index.

In a fifth aspect, combinable with any of the previous aspects, the time-related characteristic values include one or more values selected from the group comprising: creation dates, transaction dates, posting dates, clearing dates, fiscal periods, and fiscal years.

The subject matter described in this specification can be implemented in particular implementations so as to realize one or more of the following advantages. First, separation can occur between frequently used and infrequently used data. Second, data storage and administration costs can be realized by reducing the requirements on data access times and data availability for aged or infrequently used data. Third, query processing can be optimized to leverage metadata associated with infrequently used data to avoid access to the data, as determined in an early stage of query processing, as usually only frequently-used data needs to be accessed. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for partitioning data into primary and secondary databases and handling queries for access to the databases. Primary databases can include, for example, master data, active data, data related to maximum performance, transactional changes, data accessed highly frequently, data with a very short mean time to recover (MTTR), data with shorter software lifecycles, and other mission critical or frequently-used data. Secondary databases (e.g., near-line storage) can include, for example, less important data (e.g., detachable without breaking the whole system), non-active data, lower performance acceptable data, data associated with bulk loads at scheduled points in time, otherwise completely read-only data, low-frequency-access data, data having a longer MTTR, and data associated with longer software lifecycles.

Corporations or other entities may want to archive data that is no longer used or is seldom used, e.g., to spend less money (and/or other resources) for storage of secondary data, without compromising performance. Such data can be moved, for example, to secondary databases. However, queries (or other requests for accessing the data) may be received that can, on occasion, access information in the secondary databases. Some queries may fail, for example, due to the fact that the necessary data is spread among primary and secondary databases and the secondary database is not available at query execution time. It may be the case, however, that query access to the second database is not necessary, but at query execution time there is insufficient information stored in the primary database to avoid access to the secondary database. Without this knowledge, failure of the query may be unavoidable.

Figure 1:
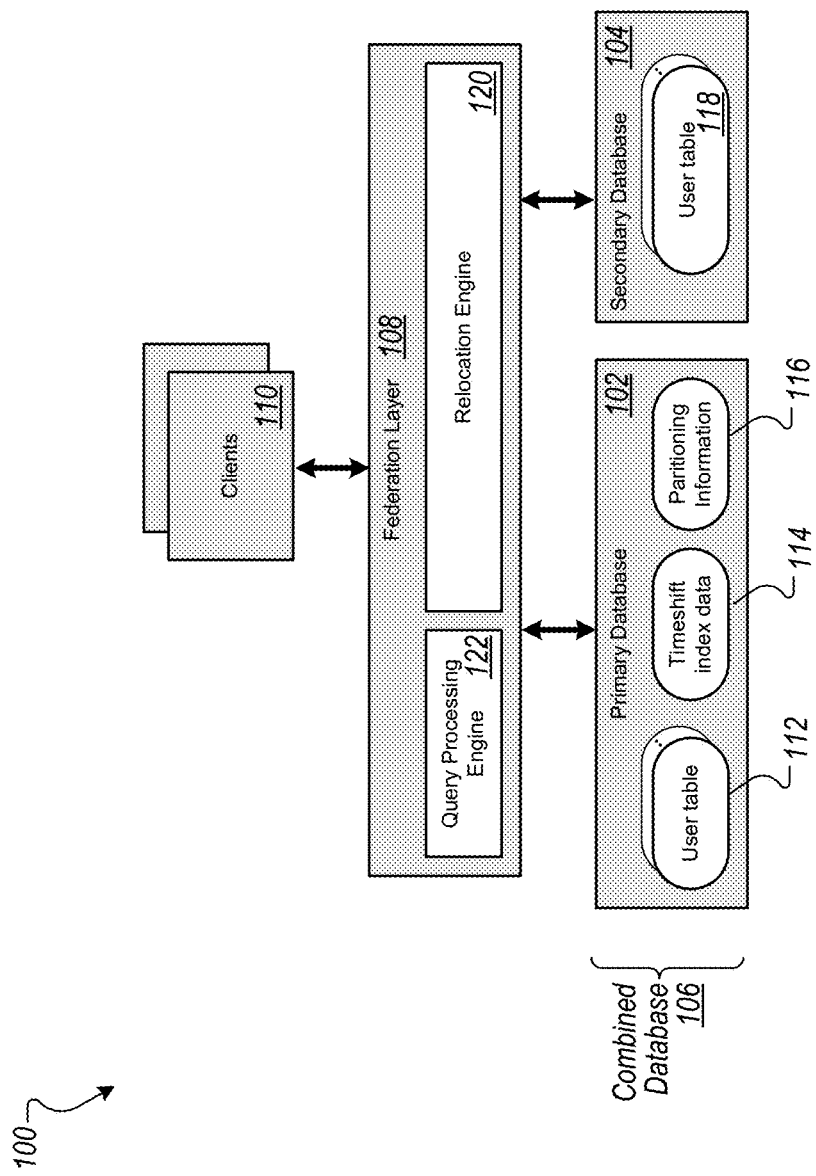
FIG. 1 is a block diagram of a system for partitioning data into a primary database (PDB) and a secondary database (SDB) according to an implementation.

FIG. 1 is a block diagram of a system 100 for partitioning data into a primary database (PDB) 102 and a secondary database (SDB) 104 according to an implementation. For example, the system 100 can be used to avoid performance degradation or abortion of queries (e.g., in case of a detached/unavailable SDB 104). For example, queries can be handled so that responding to the queries does not need to access data records from the SDB 104. To facilitate efficient handling of queries in this way, the system 100 can generate and maintain index information and statistical information within the PDB 102 that describes the partitions located in the SDB 104. For example, problems associated with accessing aged and/or inactive data can be overcome by using techniques that separate (e.g., partition) the data, with different requirements for the two parts, i.e., the PDB 102 and the SDB 104.

In some implementations, partitioning can occur on the basis of a time-slice characteristic, which is, in general, a dimension which allows interval-like selection on a time axis. The time-slice characteristic can be used for query pruning, as explained by the following example. Assume that combined database 106 (including the PDB 102 and the SDB 104) includes a (key) column "Posting date" (PDATE) that is used as primary partitioning criteria for relocation of data slices from the PDB 102 to the SDB 104. For example, all rows having a posting date less than or equal to 2013-12-13 can be relocated to the SDB 104. Subsequently, a received query will select and aggregate all rows for a single account which have been posted in 2014.

If partitioning condition PDATE≤2013-12-13 is stored in the primary database, for example, then a federation layer 108 that receives the query (e.g., from a client 110) may use this information to skip query processing within the secondary database, e.g., without the need to access the SDB 104. In some implementations, the federation layer 108 can be implemented as a layer that is separate from an application layer.

However, if the query needs to aggregate all rows for that account having the value date (VDATE) within the range of year 2014, this partitioning condition is not sufficient for the federation layer 108 to decide to skip access of the SDB 104. Although there may be no exact functional relationship between PDATE and VDATE, there may be some kind of statistical relationship between the two values for a single row. For example, the value date ranges may typically be within the range of a few days around the posting date.

In some implementations, one or more user tables 112, included in the PDB 102 include data that is being stored in the combined database 106. User tables 112 can include, for example, any type of data for any purpose, such as data related to customers, suppliers, contracts, personnel, or thousands of other types of data. Data can include, for example, key performance indicators and/or data associated with enterprise systems and/or business objects. While the example of storing user table 112 in tables is used herein, other types of storage (e.g., files) and data structures are possible and can be handled by the system 100, including in partitioning.

In some implementations, a time-shift index data 114, included in the PDB 102, can include time-shift information for data stored in the SDB 104. For example, the time-shift index data 114 can identify ranges of dates associated with data stored in the SDB 104. The time-shift index data 114 can be generated as new data is received in the combined database 106 (for data relocated to the SDB 104). The time-shift index data 114 can also be updated as needed based on changes, if any, to data in the SDB 104.

In some implementations, partitioning information 116, included in the PDB 102, can include partitioning information associated with data stored in the SDB 104. For example, the partitioning information 116 can identify which data from the combined database 106 is in the SDB 104.

One or more user tables 118 are included in the SDB 104 that include data that have been relocated to the SDB 104 from the PDB 102. For example, data in the user tables 118 can include rows relocated from the PDB 102 to the SDB 104, e.g., on the basis of date-related fields.

In some implementations, the federation layer 108 includes a relocation engine 120 for relocating data from the PDB 102 to the SDB 104. During relocation of the data, for example, the relocation engine 120 can access the one or more user tables 112 for data to be relocated. The relocation engine 120 can also update the time-shift index data 114 and the partitioning information 116 for dates associated with relocated data.

A query processing engine 122 can handle queries received from clients 110. For each received query, for example, the query processing engine 122 can use information stored in the time-shift index data 114 and the partitioning information 116 to decide whether one or more user tables 118 in the SDB 104 need to be accessed to satisfy the received query. Using the techniques described herein, processing queries can be optimized such that access to the SDB 104 occurs only when needed.

Although it would be possible to store an ordinary B*-index on column VDATE only within the PDB 102, doing so would probably not be the most efficient way (e.g., for processing queries) because a significant portion of data is still retained within the PDB 102. Further, using an ordinary B*-index can also likely increase index maintenance efforts for modified rows on the PDB 102 side. In some implementations, the problem can be solved using an improvement in which performance is increased with a marginal additional data footprint on PDB 102 and a small additional computation effort at query initialization time.

For example, time-shift indexing can be used to solve the following example problem. Consider a table with two or more columns $c_0$ and $c_i$ (e.g., for i=1 ... n) and there is an interval condition on the second column $c_i$ as:

$$c_i \text{ BETWEEN } a_i \text{ AND } b_i \tag{1}$$

Then, what are the largest value $a_0$ and the smallest value $b_0$ value, so that every row of the table, which fulfills interval condition:

$$c_0 \text{ BETWEEN } a_0 \text{ AND } b_0 \tag{2}$$

for the first column will also fulfill the interval condition for the second column?

Figure 2A:
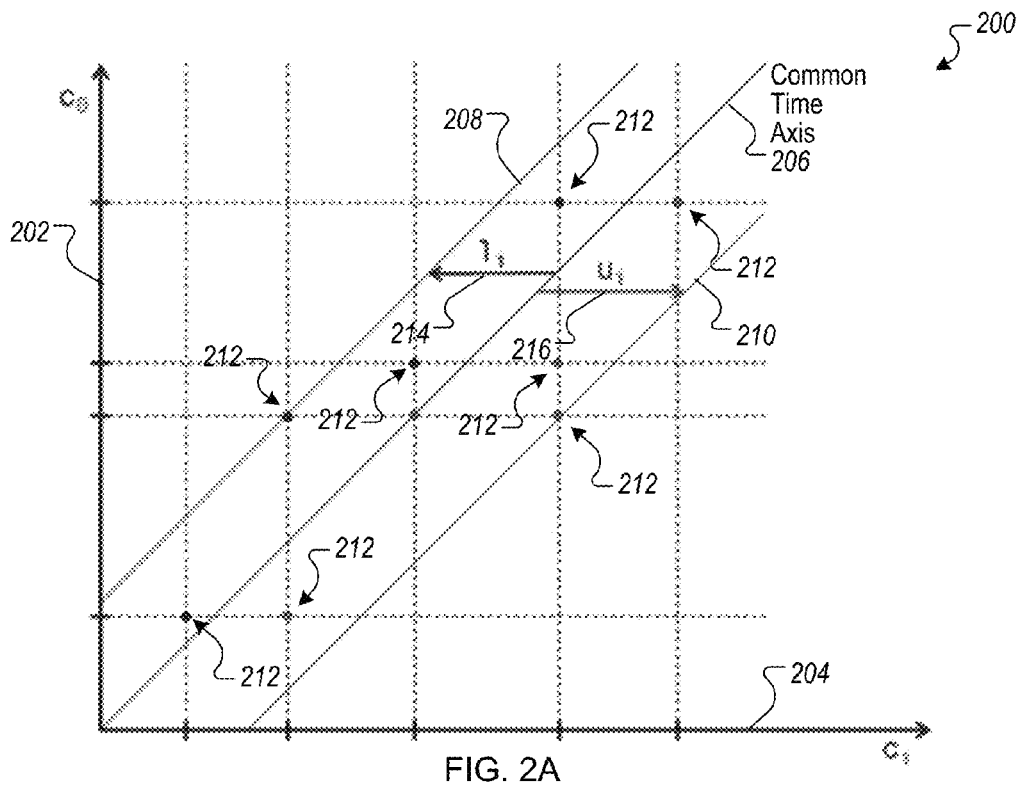
FIG. 2A is a graph showing an example time-shift according to an implementation.

FIG. 2A is a graph 200 showing an example time-shift according to an implementation. For example, the graph 200 shows a time-associated distribution of time-related characteristics. The graph 200 includes a $c_0$ time axis 202 and a $c_1$ time axis 204 that correspond to times associated with values of $c_0$ and $c_1$ used in this document. A common time axis 206 maps common times for $c_0$ and $c_1$. The example time-shift represented in the graph 200 is shown by line 208 (corresponding to $l_i$ described below) and $u_i$ line 210 (corresponding to $u_i$ described below). Lines 208 and 210 are parallel to the common time axis 206 and graphically show inclusion of data points 212 that are value pairs of $c_i$ and $c_i$. For example, the lines 208 and 210 are as close as possible to the common time axis 206 so as to include just the data points 212. Although the time-shift is in days, as will be described below, time-shifts can be in other time units, such as months, quarters, years or some other time period. Time-shift arrows 216 and 218 are time-shifts for $l_i$ and $u_i$, respectively.

For the special case that columns $c_0$ and $c_i$ are both representing absolute values (or ranges) on the time axis, identifying values such as the largest value $a_0$ and the smallest value $b_0$ value can be achieved by calculating the following two aggregates:

$$l_i := \text{MIN}(\text{floor}(c_i) - \text{floor}(c_0)) \tag{3}$$

and $$u_i := \text{MAX}(\text{floor}(c_i) - \text{floor}(c_0)) \tag{4}$$

where the scalar function floor( ) maps each value of column $c_i$ to the smallest (i.e. earliest) point in time represented by the respective value of $c_i$. The result type should be a type which allows efficient calculations of time differences. For example, the result type can be the number of days or seconds that have elapsed since a fixed reference point in time. As such, min( ) and max( ) are aggregate functions calculating appropriate aggregated values of their argument for an arbitrary row set. For later reference, column $c_0$ can be referred to as the "primary time characteristic" (PTC) and $c_i$ the "other time characteristic" (OTC). Now, $a_0$ and $b_0$ can be calculated as:

$$a_0 := \text{ceil}_0(\text{floor}(a_i) - l_i) \tag{5}$$

and $$b_0 := \text{floor}_0(\text{floor}(b_i) - u_i) \tag{6}$$

where the functions $\text{floor}_0(\ )$ and $\text{ceil}_0(\ )$ on a point in time value round down or round up this value to the nearest value of c0, respectively.

In case that the distance calculation:

$$\text{floor}(c_i) - \text{floor}(c_0) \tag{7}$$

needed for the MIN/MAX aggregation above, cannot by performed within the storage layer (e.g. RDBMS) prior to aggregation, the operations:

$$\text{SELECT MIN}(\text{floor}(c_i) - \text{floor}(c_0)) \text{FROM} \tag{8}$$

could be replaced by:

$$\text{SELECT } c_0, \text{MIN}(c_i) \text{ AS min\_}c_i, \text{MAX}(c_i) \text{ AS max\_}c_i \text{ FROM } \ldots \text{ GROUP BY } c_0 \tag{9}$$

This can increase the transported result set (e.g., between a storage layer and an application layer) only insignificantly, but still allow the overall calculation of the time-shifts within the application layer by a further aggregation step:

$$l_i = \text{MIN}(\text{floor}(\text{min\_}c_i) - \text{floor}(c_0)) \tag{10}$$

and $$u_i = \text{MAX}(\text{floor}(\text{max\_}c_i) - \text{floor}(c_0)) \tag{11}$$

The above statement can also be extended by including MIN/MAX aggregations for multiple characteristics $c_i$ (e.g., for i=1,n) within one statement. The final aggregated values $l_i$ and $u_i$ can be stored per table object and characteristic $c_i$.

Figure 2B:
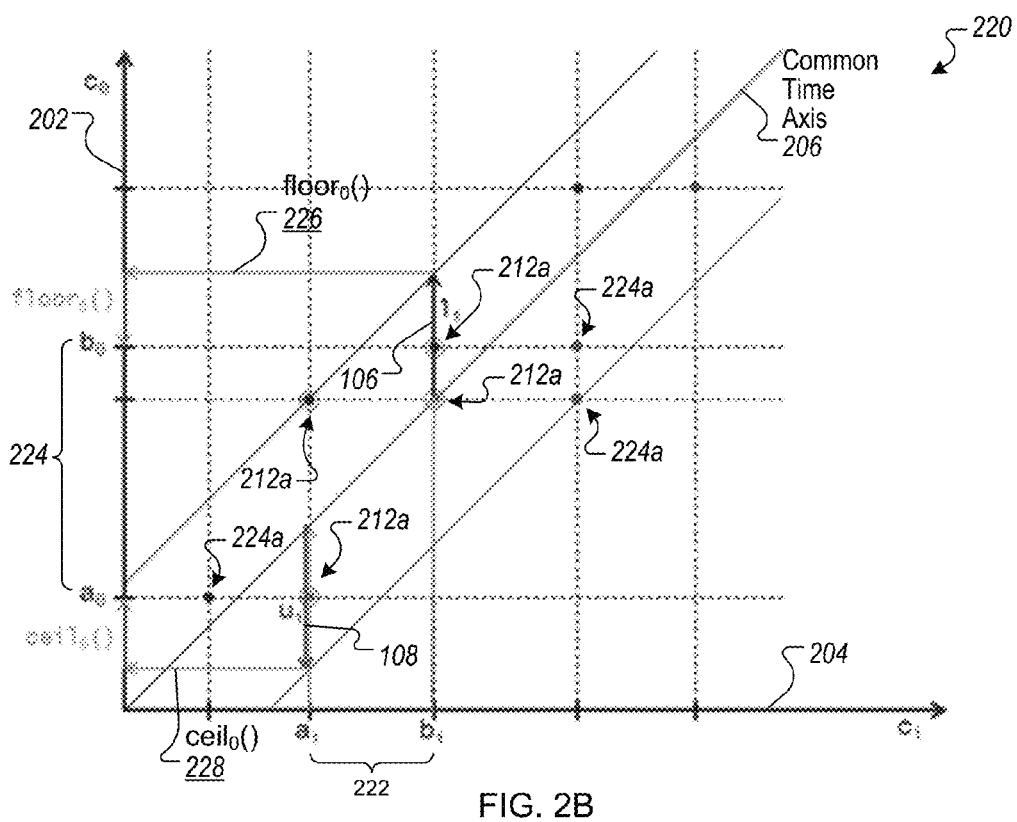
FIG. 2B is a graph showing an example of using the time-shift in query pruning according to an implementation.

FIG. 2B is a graph 220 showing an example of using the time-shift in query pruning according to an implementation. For example, query pruning can be performed if a query contains a restriction (e.g., a selection condition) on characteristic $c_i$. The restriction may be associated with values, for example, in a range of $a_1$ and $b_1$, as indicated by a range 222, as well as in a range of $a_0$ and $b_0$, as indicated by a range 224. Data points 212 from FIG. 2A that are included in the ranges 222, 224 are shown as circled data points 212a in FIG. 2B. These are the values that are the target of the query. Floor line 226 and ceil line 228 correspond to using the time-shift values determined with respect to FIG. 2A. Further, circled data points 224a include data points that are included in the range 224 but not in the range 222.

For query pruning (e.g., at query time), essentially the following steps will be performed if a query contains a restriction (e.g., a selection condition) on characteristic $c_i$. First, for each characteristic $c_i$, the condition will be transformed to a super set of the actual condition built of a list of disjoint interval conditions $[a_{ij}, b_{ij}]$ with j=1 ... $m_i$. Second, the individual interval boundaries can be transformed by:

$$\alpha_{ij} = \text{floor}(a_{ij}) + l_i \tag{12}$$

and $$\beta_{ij} = \text{floor}(b_{ij}) + u_i \tag{13}$$

forming a list of generally overlapping intervals $[\alpha_{ij}, \beta_{ij}]$ on the time axis.

These interval lists could be intersected among all restricted characteristics $c_i$, forming a final list of disjoint intervals $[\alpha_{0j}, \beta_{0j}]$ with j=1 ... $m_0$. Also, those intervals on the time axis can finally be transformed to a list of intervals $[a_{0j}, b_{0j}]$ on characteristic $c_0$ by calculating:

$$a_{0j} := \text{ceil}_0(\alpha_{0j}) \tag{14}$$

and $$b_{0j} := \text{floor}_0(\beta_{0j}) \tag{15}$$

For example, $a_{0j}$ and $b_{0j}$ can be used for intersection with the query condition and the partitioning condition of the storage object. In some implementations, if the final intersection is empty, then the query on the storage object can be completely skipped. For simplification and acceleration of pruning operation the list of intervals could be reduced in every step to a single interval (e.g. by $[\min(a_{ij}), \max(b_{ij})]$ for $j=1 \ldots m_i$ within the first step).

In an example that follows, formulas are described that may re-use formulas described above, and some formulas include substitutions using example values associated with customer revenue data. For example, assume that a CustomerRevenue table (Table 1) stores, within the primary database, the following data:

TABLE 1

| CustomerRevenue | | | | | |
|---|---|---|---|---|---|
| PostingDate | FiscalYear | FiscalPeriod | ClearingDate | Customer | Revenue |
| 2013 Feb. 17 | 2012 | 2012 November | 2013 Sep. 25 | 4710 | 80,00 |
| 2014 Feb. 5 | 2013 | 2013 November | 2014 Mar. 9 | 4711 | 100,00 |
| 2014 Mar. 30 | 2013 | 2013 December | 2014 Sep. 30 | 4712 | −50,00 |
| 2014 Apr. 4 | 2014 | 2014 January | 2014 May 9 | 4712 | 120,00 |
| 2014 May 7 | 2014 | 2014 February | 2014 Oct. 9 | 4711 | 150,00 |
| 2014 Jun. 18 | 2014 | 2014 March | 9999 Dec. 31 | 4710 | 250,00 |

Within Table 1, all time-like columns show values in ISO or ISO-like format (i.e. dates as YYYY-MM-DD). The column FiscalYear can be assumed to be the primary time characteristic (PTC), which in turn is assumed to be the partitioning criterion within this example. In some implementations, the term characteristic can also be referred to as a "dimension" such as in a multi-dimensional context or just as a "data domain" in pure relational contexts.

Assume that a "shifted fiscal year" FiscalYear starts at April 1 12 am (i.e., midnight) every calendar year, and all rows fulfilling a condition FiscalYear<=2013 have been relocated from a primary database to a secondary database (Table 2):

TABLE 2

| CustomerRevenue (secondary database) | | | | | |
|---|---|---|---|---|---|
| PostingDate | FiscalYear | FiscalPeriod | ClearingDate | Customer | Revenue |
| 2013 Feb. 17 | 2012 | 2012 November | 2013 Sep. 25 | 4710 | 80,00 |
| 2014 Feb. 5 | 2013 | 2013 November | 2014 Mar. 9 | 4711 | 100,00 |
| 2014 Mar. 30 | 2013 | 2013 December | 2014 Sep. 30 | 4712 | −50,00 |

After the relocation, the following rows remain within the primary database:

TABLE 3

| CustomerRevenue (primary database) | | | | | |
|---|---|---|---|---|---|
| PostingDate | FiscalYear | FiscalPeriod | ClearingDate | Customer | Revenue |
| 2014 Apr. 4 | 2014 | 2014 January | 2014 May 9 | 4712 | 120,00 |
| 2014 May 7 | 2014 | 2014 February | 2014 Oct. 9 | 4711 | 150,00 |
| 2014 Jun. 18 | 2014 | 2014 March | 9999 Dec. 31 | 4710 | 250,00 |

At this time, the only information which is kept within the primary database about the relocated data may be the partitioning predicate P:=FiscalYear<=2013. In some implementations, other information can be kept in the primary database that is associated with the relocated data.

Column FiscalYear may correspond to $c_0$ and ClearingDate may correspond to $c_i$ with i fixed to i=1.

Assume that a user would like to perform a query on the combined data to get the total revenue which has not yet been cleared at the end of the previous quarter (assuming we are in Q4/2014), and assume that ClearingDate=9999-12-31 is used to mark un-cleared revenues). This query can look like:

SELECT SUM(Revenue)FROM CustomerRevenue

WHERE ClearingDate BETWEEN 2014-10-01 AND
    9999-12-31     (16)

In Statement 16, $a_1$ refers to 2014-10-01, and $b_1$ refers to 9999-12-31, with $P_1$ defined as:

$$P_1 := \text{ClearingDate BETWEEN 2014-10-01 AND 9999-12-31} \quad (17)$$

which is the entire predicate of the WHERE clause in the query.

Without further knowledge about the data distribution, the query engine would have to process the query on both the primary database and the secondary database, even though looking at the example above it is obvious that only the partition located within the primary database is needed to contribute to the result. As will now be described, processing the query can be improved.

For example, initial index creation can include calculating:

$$l_1 := \text{MIN}(\text{floor}(\text{ClearingDate}) - \text{floor}(\text{FiscalYear})) \quad (18)$$

and $$u_1 := \text{MAX}(\text{floor}(\text{ClearingDate}) - \text{floor}(\text{FiscalYear})) \quad (19)$$

for all rows within the secondary database (i.e. Table 2). Floor functions, used in Equations 18 and 19 and throughout this document, can be replaced, as appropriate, with f( ) that induces a metrics for the characteristic values from the metrics on the absolute time.

The values $l_1$ and $u_1$ are calculated by the relocation engine 120, for example, during the relocation of data between the PDB 102 and the SDB 104. The values $l_1$ and $u_1$ can be stored for fast and reliable access within the PDB 102, e.g., as a separate index data for further usage by the query processing engine 122. This requires the storage of just two additional values per user table and per time-like column, e.g., as MIN and MAX in table 4.

TABLE 4

Calculation of lower ($l_1$) and upper ($u_1$) time-shifts

| Fiscal Year | Clearing Date | ... | floor(FiscalYear) | floor(ClearingDate) | floor(ClearingDate) − floor(FiscalYear) |
|---|---|---|---|---|---|
| 2012 | 2013 Sep. 25 | | 41.000,000 | 41.542,000 | 542,000 |
| 2013 | 2014 Mar. 9 | | 41.365,000 | 41.707,000 | 342,000 |
| 2013 | 2014 Sep. 30 | | 41.365,000 | 41.912,000 | 547,000 |
| MIN | | | | | 342,000 |
| MAX | | | | | 547,000 |

In the current example, $l_1=342$ and $u_1=547$, each value using three digits after the decimal point. The introduction of a day unit and a three-decimal digit precision in the calculation of lower ($l_1$) and upper ($u_1$) can be arbitrary. For example, units and precision can be defined precisely enough to be able to map all values of all relevant time-like characteristics to a common finest granularity.

The floor( ) function is a common function, overloaded per column type, which maps each value of the column type to a unique value on the time axis, so that time distances between values of different column types can be calculated (e.g. floor(ClearingDate)−floor(FiscalYear)). For consistency, every time-like column type describes consecutive ranges on the time axis, and floor( ) maps each range to its minimum value on the time axis. For example, value 2012 of column FiscalYear can represent the half-open interval from 2012-04-01T00:00:00,000 to 2013-04-01T00:00:00,000 including the lower boundary, but excluding the upper boundary. In this example, floor( ) will map FiscalYear=2012 to the "day number" 41.000,000, which is the number of days between the lower boundary of the FiscalYear=2012 range and the assumed common reference point 1989-12-30T00:00:00,000. This reference point can be arbitrarily chosen, such as using a same reference point that industry-wide applications may use to represent date and time values as numbers.

The example given by Table 4 assumes that there exists an overloaded version for function floor( ) within the database level for every column type which could be used prior to the MIN/MAX aggregation. For the given example, columns FiscalYear and FiscalPeriod might be such column types which are mapped to more generic types on database level but which still have additional semantics within the application and query processing layer.

If the floor( ) function cannot be pushed down to database level, a query returning pre-aggregated results could be issued instead.

For the current example this would be the query:

SELECT FiscalYear,

MIN(PostingDate), MAX(PostingDate),

MIN(FiscalPeriod), MAX(FiscalPeriod),

MIN(ClearingDate), MAX(ClearingDate)

FROM CustomerRevenue GROUP BY FiscalYear     (20)

Creating the following result table:

TABLE 5

Pre-aggregated result set

| Fiscal Year | MIN (Posting Date) | MAX (Posting Date) | MIN (Fiscal Period) | MAX (Fiscal Period) | MIN (Clearing Date) | MAX (Clearing Date) |
|---|---|---|---|---|---|---|
| 2012 | 2013 Feb. 17 | 2013 Feb. 17 | 2012 November | 2012 November | 2013 Sep. 25 | 2013 Sep. 25 |
| 2013 | 2014 Feb. 5 | 2014 Mar. 30 | 2013 November | 2013 December | 2014 Mar. 9 | 2014 Sep. 30 |

For example, the query just requires that there exists a MIN/MAX aggregation function for the data type representing a time-like column on database level.

Based on this pre-aggregated result, the final calculation of $l_i$ and $u_i$ can be performed within another software layer (typically the federation layer 108) where the domain-specific types are implemented and provide the proper implementation of the floor( ) function, as shown in Table 6:

TABLE 6

Calculation of lower ($l_1$) and upper ($u_1$) time-shifts from pre-aggregated results

| FiscalYear | MIN (Clearing Date) | MAX (Clearing Date) | ... | Floor (Fiscal Year) | Floor (MIN (Clearing Date)) | Floor (MAX (Clearing Date)) | Floor (MIN (Clearing Date)) − floor (Fiscal Year) | Floor (MAX (Clearing Date)) − floor (Fiscal Year) |
|---|---|---|---|---|---|---|---|---|
| 2012 | 2013 Sep. 25 | 2013 Sep. 25 | | 41.000,000 | 41.542,000 | 41.542,000 | 542,000 | 542,000 |
| 2013 | 2014 Mar. 9 | 2014 Sep. 30 | | 41.365,000 | 41.707,000 | 41.912,000 | 342,000 | 547,000 |

TABLE 6-continued

Calculation of lower ($l_1$) and upper ($u_1$) time-shifts from pre-aggregated results

| FiscalYear | MIN (Clearing Date) | MAX (Clearing Date) | ... | Floor (Fiscal Year) | Floor (MIN (Clearing Date)) | Floor (MAX (Clearing Date)) | Floor (MIN (Clearing Date)) - floor (Fiscal Year) | Floor (MAX (Clearing Date)) - floor (Fiscal Year) |
|---|---|---|---|---|---|---|---|---|
| MIN | | | | | | | 342,000 | |
| MAX | | | | | | | | 547,000 |

Then, the database layer needs just to provide the MIN and MAX aggregation on the corresponding generic data type and the preservation of the order.

Finally, the following index information can be stored within a dedicated table within the primary database (Table 7):

TABLE 7

Time-shift index table

| TableName | ColumnName | LowerShift | UpperShift |
|---|---|---|---|
| ... | | | |
| CustomerRevenue | ClearingDate | 342,000 | 547,000 |
| ... | | | |

Index maintenance can be used, for example, to account for changes in the underlying data. For example, the values $l_i$ and $u_i$ need to be recalculated every time that changes occur to table content values in the SDB 104. In some implementations, e.g., when the table within the SDB 104 is only changed incrementally (e.g., only new rows are added, but existing rows are neither updated nor deleted), the calculation of $l_i$ and $u_i$ can be performed incrementally as well, as:

$$l_{i,new} = \text{MIN}(l_{i,add}, l_{i,old}) \quad (21)$$

$$u_{i,new} = \text{MAX}(u_{i,add}, u_{i,old}) \quad (22)$$

Here, $l_{i,old}$ and $u_{i,old}$ are the old values prior to adding new rows to the secondary database, $l_{i,new}$ and $u_{i,new}$ are the new values after adding new rows to the secondary database, and $l_{i,add}$ and $u_{i,add}$ need to be recalculated as MIN and MAX from the added rows only.

In some implementations, the table part within the secondary database can be furthermore partitioned. For example, values for $l_i$ and $u_i$ can be calculated for each partition within the secondary database and can be stored on this partition level within the primary database as well. Then, the more-detailed values can be used to recalculate overall values for $l_i$ and $u_i$ more efficiently in case that only a few partitions are changed within the secondary database.

Once indexing has been performed on the SDB 104, a pruning phase can be performed for each received query. For example, with the knowledge of $l_1$ and $u_1$, the predicate $P_1$ of the query above (Statement 20) on ClearingDate can be transformed to a predicate $P_0$ on FiscalYear defined as:

$$P_0 := \text{FiscalYear BETWEEN } a_0 \text{ AND } b_0 \quad (23)$$

with:

$$a_0 := \text{ceil}_0(\text{floor}(a_1) - l_1) \quad (24)$$

and:

$$b_0 := \text{floor}_0(\text{floor}(b_1) - u_1) \quad (25)$$

The Equations 24 and 25 guarantee, for example, that the logical implication $P_1 \rightarrow P_0$ is true for all rows in Table 2. In other words, if a row of Table 2 fulfills $P_1$, then it also fulfills $P_0$. This can be reversed to $\neg P_0 \rightarrow \neg P_1$. In other words, if a row of Table 2 does not fulfill $P_0$, then it also does not fulfill $P_1$.

Using this information in the current example leads to the following calculations, e.g., shown in Table 8 for $a_0$ and in Table 9 for $b_0$:

TABLE 8

| Expression | Value | Date equivalent |
|---|---|---|
| $a_1$ | 2014 Oct. 1 | 2014 Oct. 1 |
| floor($a_1$) | 41.913,000 | 2014 Oct. 1 |
| $u_1$ | 547,000 | |
| floor($a_1$) − $u_1$ | 41.336,000 | 2013 Apr. 2 |
| $a_0 := \text{ceil}_0(\text{floor}(a_1) - u_1)$ | 2014 | 2014 Apr. 1 |

TABLE 9

| Expression | Value | Date equivalent |
|---|---|---|
| $b_1$ | 9999 Dec. 31 | 9999 Dec. 31 |
| floor($b_1$) | 2.958.465,000 | 9999 Dec. 31 |
| $l_1$ | 342,000 | |
| floor($b_1$) − $l_1$ | 2.958.123,000 | 9999 Jan. 23 |
| $b_0 := \text{floor}_0(\text{floor}(b_1) - l_1)$ | 9998 | 9998-Apr. 1 |

Using the values in Tables 8 and 9, for example, leads to the predicate:

$$P_0 := \text{FiscalYear BETWEEN 2014 AND 9998} \quad (26)$$

Now, if a row belongs to Table 2, then it fulfills predicate P because that's the way how Table 2 was constructed. If a row fulfills predicate P, then it does not fulfill predicate $P_0$ because P and $P_0$ don't have an overlap for the given example. If a row does not fulfill predicate $P_0$, then it does not fulfill predicate $P_1$ either. Finally, this means that there does not exist any row in Table 2 which fulfills the WHERE clause of the query given above and the query processing engine could skip any access to the secondary database.

In some implementations, the query in Statement 16 above can be changed slightly to:

SELECT SUM(Revenue) FROM CustomerRevenue

WHERE ClearingDate BETWEEN 2014-09-30 AND
    9999-12-31 (27)

In this example, this query also includes Clearing-Date=2014-09-30, and the calculation of $a_0$ will return a different result:

TABLE 10

| Expression | Value | Date equivalent |
|---|---|---|
| $a_1$ | 2014 Sep. 30 | 2014 Sep. 30 |
| $floor(a_1)$ | 41.912,000 | 2014 Sep. 30 |
| $u_1$ | 547,000 | |
| $floor(a_1) - u_1$ | 41.365,000 | 2013 Apr. 1 |
| $a_0 := ceil_0(floor(a_1) - u_1)$ | 2013 | 2013 Apr. 1 |

This leads to predicate:

$$P_0 := \text{FiscalYear BETWEEN 2013 AND 9998} \quad (28)$$

which is no longer disjoint to partitioning predicate P. In this case, query processing needs to include secondary storage in order to generate the overall query result.

In some implementations, alternatives can be used instead of time-shifts $l_i$ and $u_i$. For example, it can be possible to store minimum and maximum values from the secondary database for all time characteristics $c_i$, but these values would typically have different data types. One advantage of using the time-shifts is that all values for all time-like characteristics belong to a common data type. As such, the values can be stored within a common metadata table within the primary database having the table name and the characteristic name as key and the lower shift and the upper shift as an attribute.

In some implementations, time-shift information stored within the primary database and used by the federation layer 108 can also make additional indexes on columns $c_i$ obsolete within the secondary database, e.g., making use of a single index on column $c_0$ instead mapping predicates on $c_i$ to predicates on $c_0$.

Figure 3:
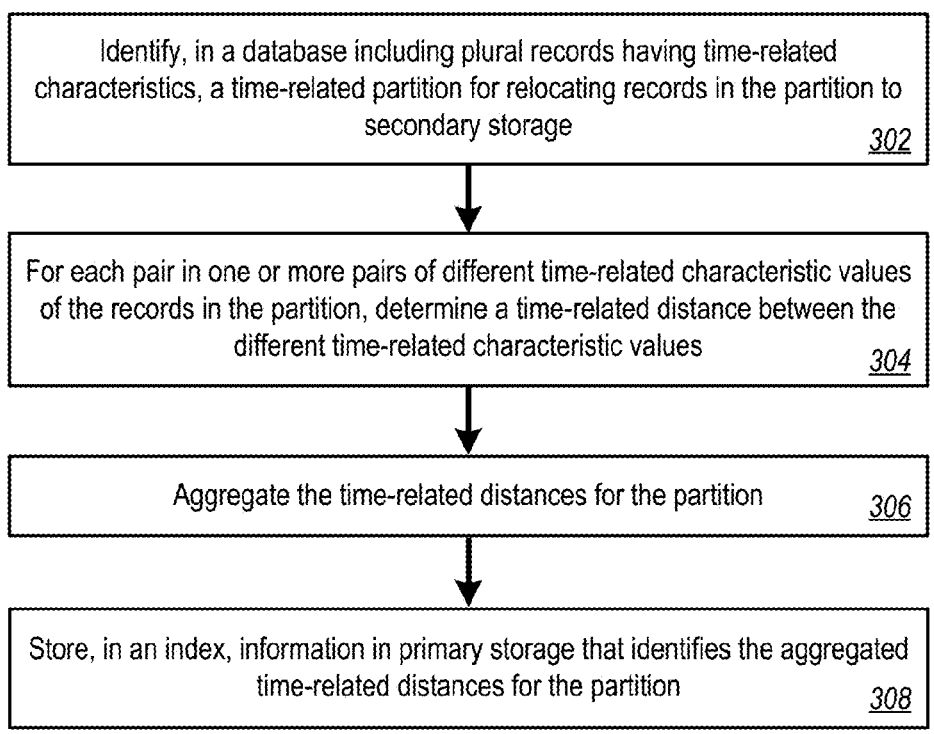
FIG. 3 is a flowchart of an example method for storing information according to an implementation.

FIG. 3 is a flowchart of an example method 300 for storing information according to an implementation. For clarity of presentation, the description that follows generally describes method 300 in the context of FIGS. 1-2B. However, it will be understood that the method 300 may be performed, for example, by any other suitable system, environment, software, and hardware, or a combination of systems, environments, software, and hardware as appropriate. For example, the system 100 and/or its components can be used to execute the method 300.

At 302, in a database including plural records having time-related characteristics, a time-related partition is identified for relocating records in the partition to secondary storage. For example, the relocation engine 120 can identify a partition in the one or more user tables 112, as described above with respect to FIGS. 2A-2B. Tables 1-3, described above, identify example data that is to be partitioned, as well as the data that is to be stored in primary and secondary storage.

At 304, for each pair in one or more pairs of different time-related characteristic values of the records in the partition, a time-related distance is determined between the different time-related characteristic values. As an example, the federation layer 108 can determine distances associated with time-related characteristic values, as described above with respect to FIGS. 2A-2B and Tables 4-5. Example time-related characteristic values include creation dates, transaction dates, posting dates, clearing dates, fiscal periods, fiscal years, and other time-related dates or values.

In some implementations, a pair can include a time-related characteristic that is used for partitioning and another time-related characteristic. Having n time-related characteristics can then require considering just n−1 pairs. For example, it is not necessary to consider n*(n−1)/2 distinct pairs.

In some implementations, e.g., in another context, the time-related aggregated distances include a time-related range of values including a lower limit that is a minimum of time-related distances between pairs of time-related characteristic values and an upper limit that is a maximum of time-related distances between pairs of time-related characteristic values. For example, the relocation engine 120 can determine values associated with Equations 18 and 19 that can serve, for example, as a monotonous mapping of characteristic values to an absolute time value in general (e.g., days or seconds since a fix reference point in time).

At 306, the time-related distances are aggregated for the partition. As an example, the federation layer 108 can perform aggregation on the time-related distances, as described above with reference to FIGS. 2A-2B. Updating the time-shift index data 114 and the partitioning information 116 can include, for example, the use of the equations described above with reference to FIGS. 2A-2B and information in Tables 6-9.

At 308, information is stored in an index in primary storage that identifies the aggregated time-related distances for the partition. For example, the relocation engine 120 can also update the time-shift index data 114 and the partitioning information 116 for dates associated with relocated data, as described above.

In some implementations, the method 300 further includes steps associated with index maintenance. For example, the federation layer 108 can detect that an update has occurred to a record in the secondary storage (e.g., the secondary database 104). If an update has occurred, the federation layer 108 can update information associated with secondary storage in the primary database 102, including updating the index in association with the update.

Figure 4:
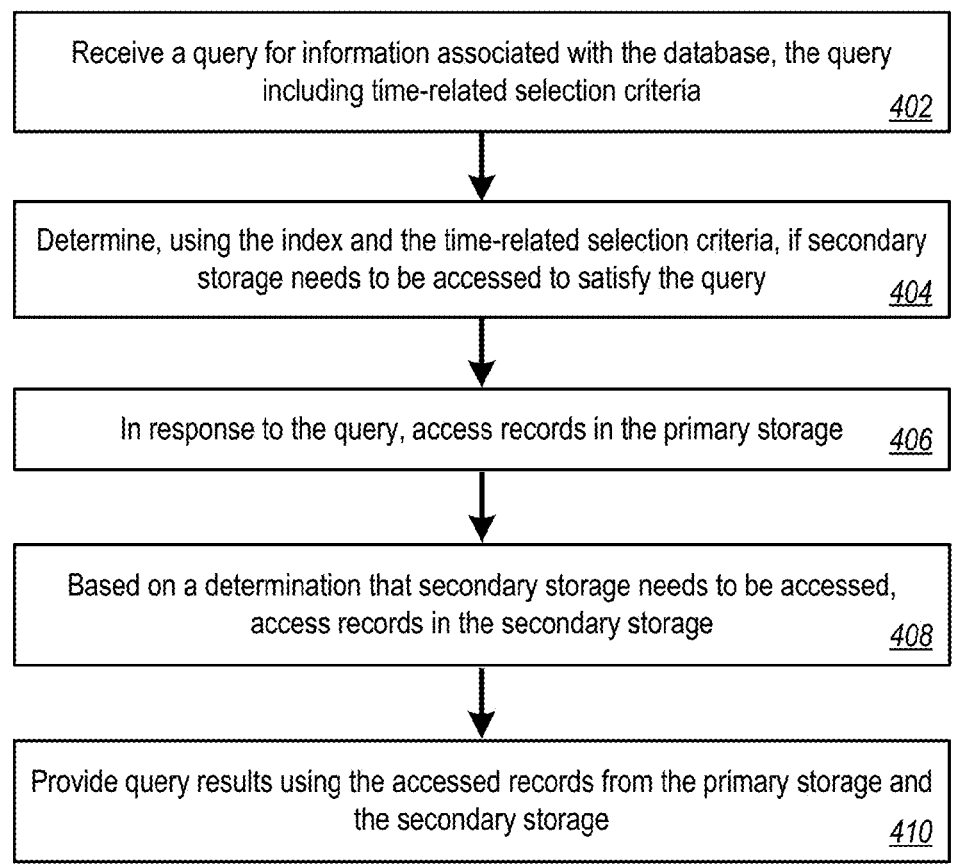
FIG. 4 is a flowchart of an example method for retrieving information according to an implementation.

FIG. 4 is a flowchart of an example method 400 for accessing information according to an implementation. For example, the access can be in the form of a query that is received, the querying being associated with information stored with reference to FIG. 3. For clarity of presentation, the description that follows generally describes method 400 in the context of FIGS. 1-2B. However, it will be understood that the method 400 may be performed, for example, by any other suitable system, environment, software, and hardware, or a combination of systems, environments, software, and hardware as appropriate. For example, the system 100 and/or its components can be used to execute the method 400.

At 402, a query is received for information associated with the database, the query including time-related selection criteria. For example, the federation layer 108 can receive a query from the client 110 that is to be performed by the query processing engine 122. The query can be, for example, in the form of Statement 20, described above.

At 404, using the index and the time-related selection criteria, a determination is made if secondary storage needs to be accessed to satisfy the query. As an example, the query processing engine 122 can process the query and determine if information in the secondary database 104 needs to be accessed in order to process the query.

At 406, in response to the query, records are accessed in the primary storage. The query processing engine 122, for example, can access data that is stored in the primary database 102.

At 408, based on a determination that secondary storage needs to be accessed, records are accessed in the secondary storage. The query processing engine 122, for example, can access data that is stored in the secondary database 104, e.g., if any of the data needed to satisfy the query has been archived.

At 410, query results are provided using the accessed records from the primary storage and the secondary storage. The query processing engine 122, for example, can provide query results back to the client 110, the query results including data accessed from the primary database 102 and, if necessary, secondary database 104, as described above.

In some implementations, the method 400 includes creating a pruned query, including transforming a predicate in the query based on information in the index. For example, pruning (e.g., in as used in informatics) can be used to attempt to reduce the amount of time- and/or resource-consuming decisions needed to obtain a certain result. A selection condition, associated with a query, can exist that is a Boolean function $Q(r)$ that maps a single record (e.g., referred to as a tuple) r to a Boolean value. If the value of the function is true, then the record is selected for the query result. If the value of the function is false, then the record is not selected. The partitioning can be defined as a Boolean function $P(r)$, which decides whether a record belongs to the partition or not. It might be more expensive or time-consuming to evaluate $Q(r)$ for record belonging to partition P (secondary database) than for records not belonging to P (primary database).

In some implementations, a first step of pruning can be to find a simple Boolean expression $Q_i$ (i>0) in such a way that $Q_i \rightarrow Q$ holds true (e.g., find a $Q_i$ that is a superset of Q). In this discussion, "$\rightarrow$" denotes Boolean implication. If $Q_i \rightarrow Q$ is true, then also $Q_i \wedge P \rightarrow Q \wedge P$ will be true. Here $Q_i$ refers to a Boolean expression which just depends solely on the ith component of the tuple r. Component i might be referred to as an "other time characteristic" mentioned above.

The next pruning step can derive a Boolean expression $Q_0$ from $Q_i$ in such a way that $Q_i \wedge P \rightarrow Q_0 \wedge P$ holds true for every valid record/tuple r. This step can make use of the $l_i$ and $u_i$ described above.

Figure 5:
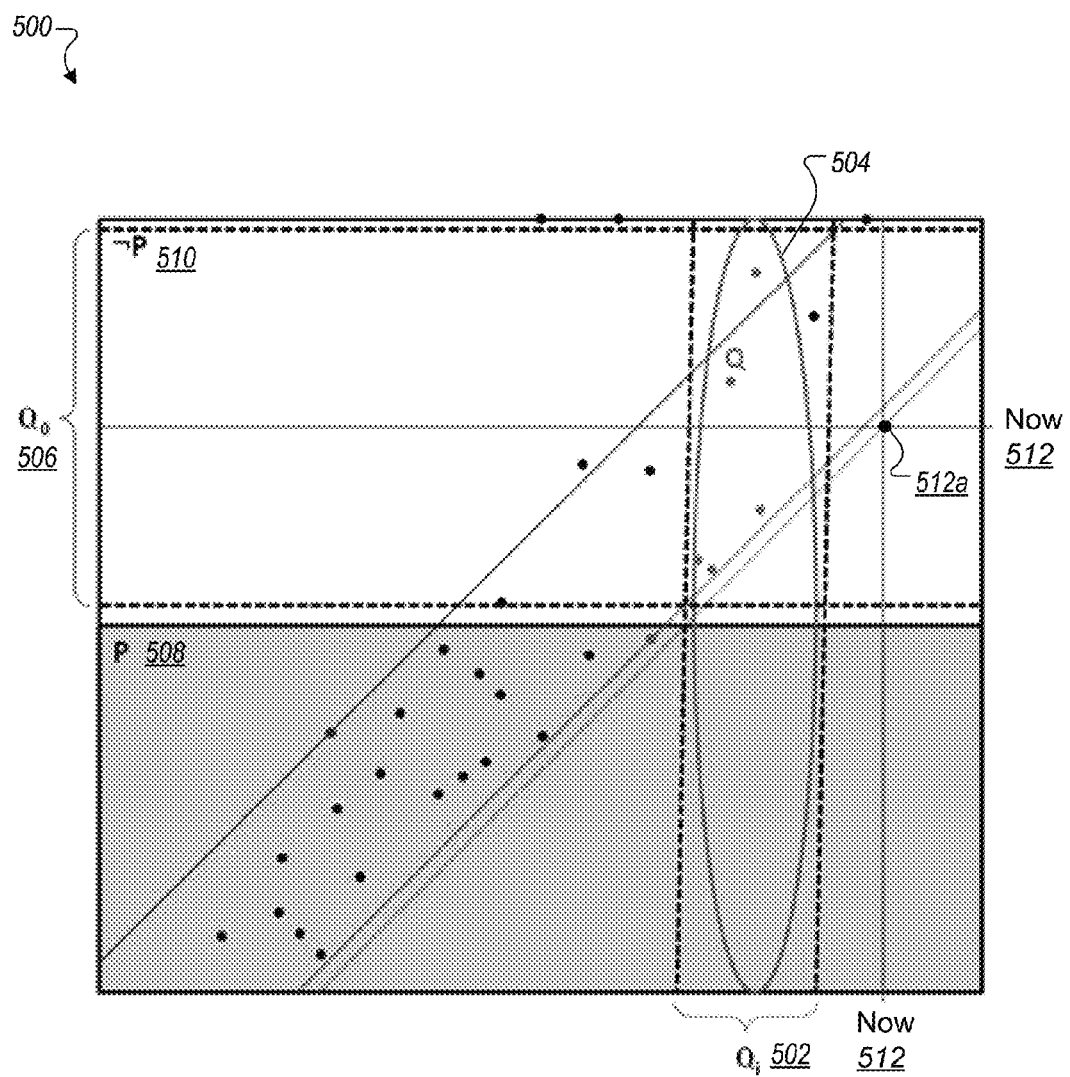
FIG. 5 shows an example query pruning graph according to an implementation.

FIG. 5 shows an example query pruning graph 500 according to an implementation. $Q_i$, Q, and $Q_0$, for example, are shown as elements 502, 504 and 506, respectively. Partition P is shown as element 508, thus data points not belonging to P are shown as ¬P (as element 510). The current time (e.g., now 512a) is indicated by an intersection of lines 512.

Finally, the pruning tries to formally prove that $Q_0 \wedge P$ is false for any record/tuple r. If this is the case, then one can conclude that $Q \wedge P$ is also false by using chain interference and the negations of the above Boolean propositions $\neg(Q_0 \wedge P) \rightarrow \neg(Q_i \wedge P)$ and $\neg(Q_i \wedge P) \rightarrow \neg(Q \wedge P)$. In this case, $Q(r)$ does need to be evaluated for any record/tuple belonging to P.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method, comprising:
    identifying, in a database including plural records having time-related characteristics, a time-related partition for relocating records in the partition from a primary storage to secondary storage;
    for each pair in one or more pairs of different time-related characteristic values of the records in the partition, determining a time-related distance between the different time-related characteristic values;
    aggregating the time-related distances for the partition; and
    storing, as separate data in an index of primary storage, information that identifies the aggregated time-related distances for the secondary storage for use in query processing to decide whether secondary storage is to be accessed to satisfy a query.

2. The method of claim 1, further comprising:
    receiving a query for information associated with the database, the query including time-related selection criteria; and
    determining, using the separate data in the index and the time-related selection criteria, if secondary storage needs to be accessed to satisfy the query.

3. The method of claim 2, further comprising:
    in response to the query, accessing records in the primary storage;
    based on a determination that secondary storage needs to be accessed, accessing records in the secondary storage; and
    providing query results using the accessed records from the primary storage and the secondary storage.

4. The method of claim 1, wherein the time-related aggregated distances include:
    a lower limit that is a minimum of time-related distances between pairs of time-related characteristic values; and
    an upper limit that is a maximum of time-related distances between pairs of time-related characteristic values.

5. The method of claim 1, further comprising:
    detecting that an update has occurred to a record in the secondary storage; and
    updating the separate data in the index in association with the update.

6. The method of claim 1, further comprising creating a pruned query, including transforming a predicate in the query based on information in the index.

7. The method of claim 1, wherein the time-related characteristic values include one or more values selected from the group comprising: creation dates, transaction dates, posting dates, clearing dates, fiscal periods, and fiscal years.

8. A computer-readable media, the computer-readable media comprising computer-readable instructions embodied on tangible, non-transitory media, the instructions operable when executed by at least one computer to:
    identify, in a database including plural records having time-related characteristics, a time-related partition for relocating records in the partition from a primary storage to secondary storage;
    for each pair in one or more pairs of different time-related characteristic values of the records in the partition, determine a time-related distance between the different time-related characteristic values;
    aggregate the time-related distances for the partition; and
    store, as separate data in an index of primary storage, information that identifies the aggregated time-related distances for the secondary storage for use in query processing to decide whether secondary storage is to be accessed to satisfy a query.

9. The media of claim 8, further comprising instructions to:
    receive a query for information associated with the database, the query including time-related selection criteria; and
    determine, using the separate data in the index and the time-related selection criteria, if secondary storage needs to be accessed to satisfy the query.

10. The media of claim 9, further comprising instructions to:
    in response to the query, access records in the primary storage;
    based on a determination that secondary storage needs to be accessed, access records in the secondary storage; and
    provide query results using the accessed records from the primary storage and the secondary storage.

11. The media of claim 8, wherein the time-related aggregated distances include:
    a lower limit that is a minimum of time-related distances between pairs of time-related characteristic values; and
    an upper limit that is a maximum of time-related distances between pairs of time-related characteristic values.

12. The media of claim 8, further comprising instructions to:
    detect that an update has occurred to a record in the secondary storage; and
    update the separate data in the index in association with the update.

13. The media of claim 8, further comprising instructions to create a pruned query, including transforming a predicate in the query based on information in the index.

14. The media of claim 8, wherein the time-related characteristic values include one or more values selected from the group comprising: creation dates, transaction dates, posting dates, clearing dates, fiscal periods, and fiscal years.

15. A system comprising:
a hardware processor interoperably coupled with a computer memory and configured to:
identify, in a database including plural records having time-related characteristics, a time-related partition for relocating records in the partition from a primary storage to secondary storage;
for each pair in one or more pairs of different time-related characteristic values of the records in the partition, determine a time-related distance between the different time-related characteristic values;
aggregate the time-related distances for the partition; and
store, as separate data in an index of primary storage, information that identifies the aggregated time-related distances for the secondary storage for use in query processing to decide whether secondary storage is to be accessed to satisfy a query.

16. The system of claim 15, further configured to:
receive a query for information associated with the database, the query including time-related selection criteria; and
determine, using the separate data in the index and the time-related selection criteria, if secondary storage needs to be accessed to satisfy the query.

17. The system of claim 16, further configured to:
in response to the query, access records in the primary storage;
based on a determination that secondary storage needs to be accessed, access records in the secondary storage; and
provide query results using the accessed records from the primary storage and the secondary storage.

18. The system of claim 15, wherein the time-related aggregated distances include:
a lower limit that is a minimum of time-related distances between pairs of time-related characteristic values; and
an upper limit that is a maximum of time-related distances between pairs of time-related characteristic values.

19. The system of claim 15, further configured to:
detect that an update has occurred to a record in the secondary storage; and
update the separate data in the index in association with the update.

20. The system of claim 15, further configured to create a pruned query, including transforming a predicate in the query based on information in the index.

* * * * *